US012751361B2

(12) United States Patent
Clark et al.

(10) Patent No.: US 12,751,361 B2
(45) Date of Patent: Oct. 6, 2026

(54) HEADER MOUNTED RADAR FOR GROUND DETECTION AND ACTIVE HEADER CONTROL

(71) Applicant: DEERE & COMPANY, Moline, IL (US)

(72) Inventors: Scott N. Clark, Bettendorf, IA (US); John A. Dighton, Napoleonville, LA (US)

(73) Assignee: Deere & Company, Moline, IL (US)

( * ) Notice: Subject to any disclaimer, the term of this patent is extended or adjusted under 35 U.S.C. 154(b) by 344 days.

(21) Appl. No.: 18/535,002

(22) Filed: Dec. 11, 2023

(65) Prior Publication Data

US 2024/0099191 A1 Mar. 28, 2024

Related U.S. Application Data

(63) Continuation-in-part of application No. 17/863,618, filed on Jul. 13, 2022, now Pat. No. 12,477,986.

(51) Int. Cl.
*A01D 41/127* (2006.01)
*A01D 41/14* (2006.01)

(52) U.S. Cl.
CPC ......... *A01D 41/127* (2013.01); *A01D 41/141* (2013.01)

(58) Field of Classification Search
CPC ..... A01D 41/127; A01D 41/141; A01D 45/10
See application file for complete search history.

(56) References Cited

U.S. PATENT DOCUMENTS

| | | | |
|---|---|---|---|
| 4,507,910 | A | 4/1985 | Thornley et al. |
| 6,791,488 | B2 | 9/2004 | Diekhans et al. |
| 7,401,455 | B1 | 7/2008 | Cleodolphi |
| 8,452,501 | B1 | 5/2013 | Lange et al. |
| 10,058,028 | B2 | 8/2018 | Richard et al. |
| 10,371,561 | B2 | 8/2019 | Darr et al. |

(Continued)

FOREIGN PATENT DOCUMENTS

| | | |
|---|---|---|
| CN | 110352707 A | 10/2019 |
| CN | 210130137 U | 3/2020 |

(Continued)

OTHER PUBLICATIONS

"Conceptual Design of an Active Automatic Height Control System for Sugarcane Harvesting," University of Khartoum, Ibrahim M. Bushra Babiker Hijazi, et al., 67 pages, publicly available by Jul. 13, 2022.

(Continued)

*Primary Examiner* — Arpad Fabian-Kovacs

(74) *Attorney, Agent, or Firm* — Taft Stettinius & Hollister LLP; Stephen F. Rost

(57) ABSTRACT

An agricultural harvester for harvesting a crop. The agricultural harvester includes a frame and a crop gatherer extending from and being moveably coupled to the frame. The crop gatherer includes one of a crop divider, a crop cutter, or a crop remover. A radar assembly is operatively connected to the crop gatherer, wherein the radar assembly transmits electromagnetic waves toward a ground to identify a ground level. A controller is operatively connected to the radar assembly and the crop gatherer, wherein the controller receives the identified ground level from the radar assembly and adjusts a height of the crop gatherer with respect to the ground.

20 Claims, 11 Drawing Sheets

(56) References Cited

U.S. PATENT DOCUMENTS

| | | | | |
|---|---|---|---|---|
| 10,827,676 | B2 | 11/2020 | Dighton | |
| 11,483,972 | B2 | 11/2022 | Dima | |
| 11,744,180 | B2 | 9/2023 | Gunda | |
| 11,963,480 | B2 | 4/2024 | Martin | |
| 12,102,025 | B2 | 10/2024 | Schroeder | |
| 12,232,448 | B2 | 2/2025 | Luca | |
| 2003/0000193 | A1 | 1/2003 | Beck et al. | |
| 2003/0019196 | A1 | 1/2003 | Coers | |
| 2003/0184747 | A1 | 10/2003 | Diekhans et al. | |
| 2004/0006958 | A1 | 1/2004 | Thiemann et al. | |
| 2008/0155953 | A1* | 7/2008 | Cleodolphi | A01D 41/141 56/10.2 E |
| 2013/0116894 | A1* | 5/2013 | Perez-Iturbe | A01D 45/10 701/50 |
| 2016/0106038 | A1* | 4/2016 | Boyd | A01D 34/006 56/10.2 J |
| 2017/0064904 | A1 | 3/2017 | Figgins | |
| 2018/0332768 | A1 | 11/2018 | Isaac | |
| 2019/0307070 | A1* | 10/2019 | Dima | A01D 57/04 |
| 2020/0068804 | A1 | 3/2020 | Barther et al. | |
| 2020/0163277 | A1* | 5/2020 | Cooksey | A01D 41/127 |
| 2021/0055099 | A1 | 2/2021 | Walther et al. | |
| 2021/0137006 | A1 | 5/2021 | Shearer et al. | |
| 2021/0185916 | A1 | 6/2021 | Hunt | |
| 2022/0132740 | A1 | 5/2022 | Hunt | |
| 2022/0354055 | A1 | 11/2022 | Hermann | |
| 2023/0000015 | A1 | 1/2023 | Hermann et al. | |
| 2023/0025352 | A1 | 1/2023 | Hunt et al. | |
| 2023/0062392 | A1* | 3/2023 | Brokaw | A01D 41/141 |
| 2023/0139169 | A1* | 5/2023 | Cleodolphi | A01D 41/127 701/50 |
| 2024/0016093 | A1* | 1/2024 | Dighton | A01D 45/10 |
| 2024/0122109 | A1 | 4/2024 | Hunt et al. | |
| 2024/0155975 | A1 | 5/2024 | Deruyter et al. | |
| 2024/0260506 | A1* | 8/2024 | Vadnere | A01D 34/006 |
| 2024/0324509 | A1* | 10/2024 | Lauwerys, II | A01B 63/008 |
| 2024/0357968 | A1* | 10/2024 | Hunt, II | A01D 41/127 |
| 2025/0098581 | A1 | 3/2025 | Christiansen et al. | |
| 2025/0143283 | A1* | 5/2025 | Hunt | G01S 13/867 |
| 2025/0331461 | A1* | 10/2025 | Lucca | A01D 45/10 |

FOREIGN PATENT DOCUMENTS

| | | | | |
|---|---|---|---|---|
| CN | 112056087 | A | 12/2020 | |
| CN | 117378353 | A | 1/2024 | |
| CN | 221178491 | U | 6/2024 | |
| DE | 2654141 | A1 | 6/1978 | |
| DE | 102016202628 | A1 | 8/2017 | |
| DE | 102016116808 | A1 | 3/2018 | |
| DE | 102017129193 | A1 | 6/2019 | |
| DE | 102019207984 | A1 | 12/2020 | |
| EP | 2545761 | B1 | 1/2013 | |
| EP | 2681984 | B1 | 1/2016 | |
| EP | 3430881 | A1 | 1/2019 | |
| EP | 2775818 | B1 | 8/2019 | |
| EP | 4201189 | A1 * | 6/2023 | A01D 43/085 |

OTHER PUBLICATIONS

"Basecutter sensor is 'like being on automatic pilot", Nick Kennedy, Australian Canegrower, 2 pages, Sep. 7, 2009.

https://doi.org/10.1016/j.biosystemseng.2022.04.024; Liang Zhao et al; Ground surface detection method using ground penetrating radar signal for sugarcane harvester base-cutter control, Research Paper-Biosystems Engineering; May 15, 2022; pp. 1-7 [online].

https://sensorlogic.ai/; SensorLogic, Sensor Technology and Services; pp. 1-3 [online].

http://eprints.jcu.edu.au/2123; Page, Rayner Lunke (2006); Ground detection sensor for cane harvester base-cutter height control. Masters (Research) thesis, James Cook University; pp. 119.

CNH, Agritechnica innovation silver medal for New Case IH Axial-Flow Feedrate Radar System, retrieved from <URL: https://media.cnh.com/emea/case-ih/agritechnica-innovation-silver-medal-for-new-case-ih-axial-flow-feedrate-radar-system/s/72236a2f-186e-490e-a13a-2d54f4d4f1b5, posted on Sep. 26, 2023, 3 pages.

* cited by examiner

HEADER MOUNTED RADAR FOR GROUND DETECTION AND ACTIVE HEADER CONTROL

RELATED APPLICATION

This application is continuation-in-part application of U.S. application Ser. No. 17/863,618, filed Jul. 13, 2022, which is hereby incorporated by reference in its entirety.

FIELD OF THE DISCLOSURE

The present invention generally relates to an agricultural machine, and more particularly to a system and method for harvesting crops.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, cotton harvesters, corn harvesters, grain harvesters, and specialty harvesters, each having harvesting systems of various types. Harvesting systems for a sugarcane harvester, for example, include assemblies or devices for cutting, chopping, sorting, transporting, and otherwise gathering and processing sugarcane plants. Typical harvesting assemblies, in different implementations, include a base cutter assembly (or "base cutter"), feed rollers, cutting drums, stalk collectors, and extractor fans etc. Corn harvesters can includes a corn head that removes corn ears from standing rows of corn using gathering chains. Grain harvesters can include a sickle to cut a grain stalk from its base and a reel that gathers the cut stalks to a feeding system directing material to a threshing apparatus where clean grain is separated from the plant material.

In various harvesters, harvesting attachments include adjustable crop gathering apparatus(es) which are adjustable with respect to ground. Typically, the adjustment of the attachment or gathering device with respect to ground is made manually by an operator to accommodate different ground conditions as well to accommodate different crop conditions, including crop height, moisture, or plant orientation.

SUMMARY

What is needed therefore is a crop harvester having a crop gathering apparatus that efficiently and effectively harvests crops as well as reduces a likelihood of damaging the crop gathering apparatus from ground contact.

In one implementation there is provided an agricultural harvester operable to move in a forward direction to harvest crop growing from a ground. The agricultural harvester includes a frame and a crop gatherer extending from and being moveably coupled to the frame. The crop gatherer includes one of a crop divider, a crop cutter, or a crop remover. A radar assembly is operatively connected to the crop gatherer and transmits electromagnetic waves toward the ground to identify a ground level. A controller is operatively connected to the radar assembly and the crop gatherer, wherein the controller receives the identified ground level from the radar assembly and adjusts a height of the crop gatherer with respect to the ground.

In some implementations, the agricultural harvester further includes a radar support arranged to locate the radar assembly at or forward of one of the crop divider, the crop cutter, or the crop remover.

In some implementations, the agricultural harvester includes wherein the radar assembly is arranged to emit a radio wave along a path aimed in a downward direction generally perpendicular to the forward direction.

In some implementations, the agricultural harvester includes wherein the radar assembly is arranged to emit a radio wave along a path aimed in a forward looking field of view generally forward of a line extending generally perpendicular from the ground and from one of the crop divider, the crop cutter, or the crop remover, relative to the forward direction while harvesting crop.

In some implementations, the agricultural harvester includes wherein the path of the radar assembly in the forward looking field of view forms an angle with the line having a value of between approximately 0 degrees and 45 degrees.

In some implementations, the agricultural harvester includes wherein the path of the radar assembly in the forward looking direction forms an angle with the line having a value of between approximately 0 degrees 30 degrees.

In some implementations, the agricultural harvester includes wherein the radar support locates the radar assembly at a distance between 0.1 meters and 2 meters above the ground.

In some implementations, the agricultural harvester includes wherein the radar assembly includes one of a ground penetrating radar, an ultra-wide band radar, or a fixed frequency radar.

In another implementation, there is provided a method of harvesting a crop from a ground of a field using an agricultural harvester, the method includes: identifying a crop gathering height for harvesting the crop from the field, wherein the crop gathering height is a height determined with respect to a crop gatherer and the ground; determining, with a radar assembly, a distance between the ground and the crop gatherer; comparing the identified crop gathering height to the determined distance between the ground and the crop gatherer; adjusting the distance between the crop gatherer and the ground based on the comparing step; and moving the agricultural harvester through the field to harvest the crop at the adjusted distance of the crop gatherer.

In some implementations, the method includes supporting the radar assembly on the crop gatherer with a radar support.

In some implementations, the method includes wherein the supporting step includes wherein the radar support locates the radar assembly at or forward of one of a crop divider, a crop cutter, or a crop remover of the crop gatherer.

In some implementations, the method includes wherein the supporting step includes supporting the radar assembly in a position arranged to emit a radio wave directed along a path aimed in a downward direction generally perpendicular to a moving direction of the agricultural harvester.

In some implementations, the method includes wherein the supporting step includes supporting the radar assembly in a position arranged to emit a radio wave directed along a path aimed in a forward looking field of view generally forward of a line extending generally perpendicular from the ground and from one of the crop divider, the crop cutter, or the crop remover.

In some implementations, the method includes wherein the path of the radar assembly in a position looking field of view forms an angle with the line having a value of between approximately 0 degrees and 45 degrees.

In some implementations, the method includes wherein the path of the radar assembly in the forward looking field of view forms an angle with the line having a value of between approximately 0 degrees 30 degrees.

In some implementations, the method includes wherein the supporting step includes supporting the radar assembly at a distance equal to or less than 2 meters above the ground.

In some implementations, the method includes wherein the comparing step includes comparing the identified crop gathering height to the determined distance between the ground and the crop gatherer on a continuous basis as the agricultural harvester moves through the field harvesting crop.

In some implementations, the method includes wherein the adjusting step includes adjusting the distance between the crop gatherer and the ground, based on the comparing step, on a continuous basis as the agricultural harvester moves through the field harvesting crop.

In a further implementation, there is provided a crop gatherer for harvesting crop from a ground. The crop gatherer includes a lift actuator and a crop header operatively coupled to the lift actuator. The crop header includes one of a crop divider, a crop cutter, or a crop remover, wherein the lift actuator adjusts a position of the crop header with the ground. A radar assembly is coupled to the crop header, and is configured to transmit an electromagnetic wave and to receive reflected electromagnetic waves to identify a ground level of the ground. The radar assembly includes a radar support arranged to locate the radar assembly at or forward of one of the crop divider, the crop cutter, or the crop remover.

In some implementations, the crop gatherer includes wherein the radar support includes a support arm and an adjustment mechanism operatively connected to the support arm, wherein the adjustment mechanism is adjustable to locate the support arm to position the radar assembly at or forward of one of the crop divider, the crop cutter, or the crop remover.

BRIEF DESCRIPTION OF THE DRAWINGS

The above-mentioned aspects of the present invention and the manner of obtaining them will become more apparent and the invention itself will be better understood by reference to the following description of the implementations of the invention, taken in conjunction with the accompanying drawings.

DETAILED DESCRIPTION

Figure 1:
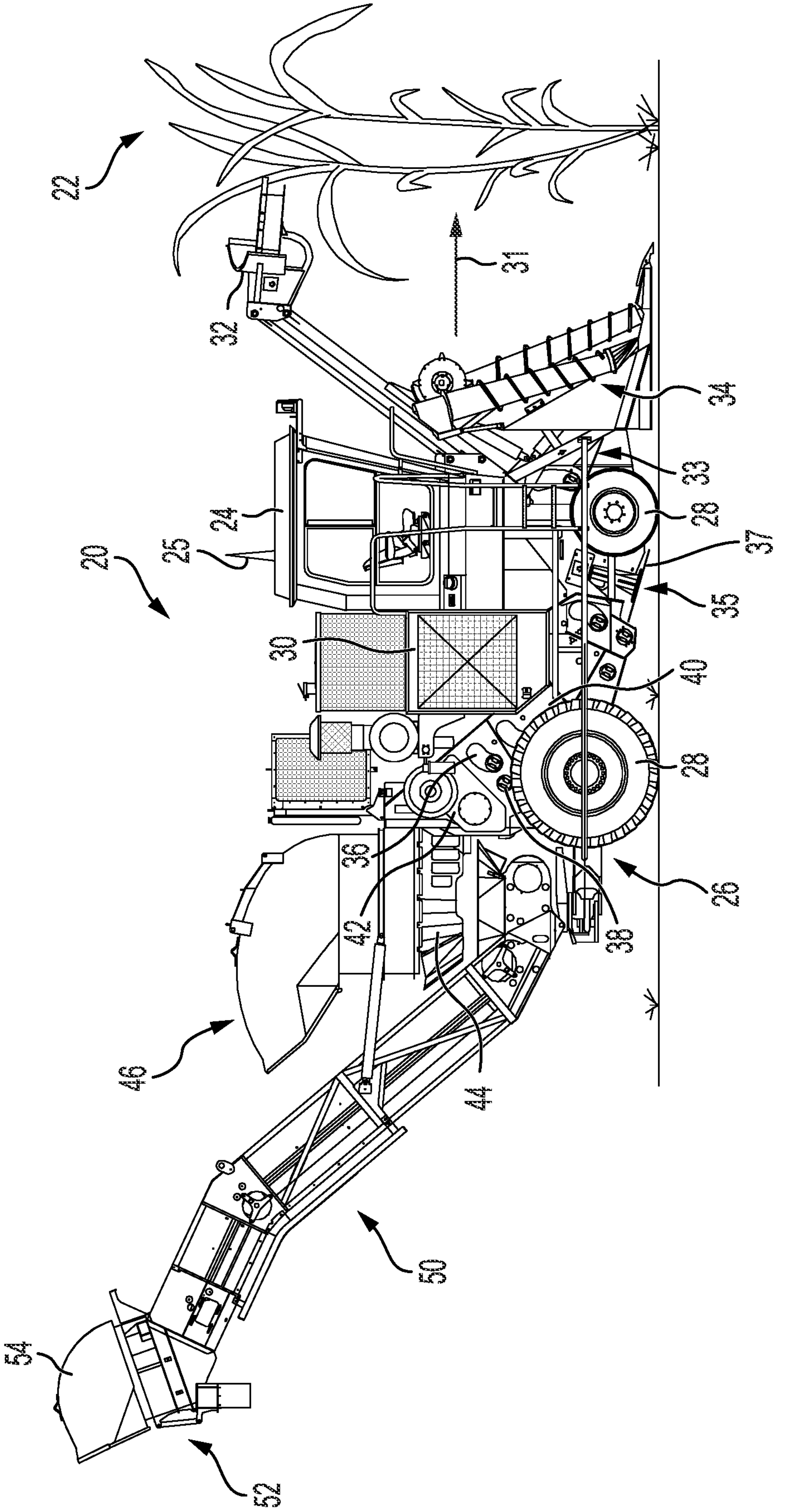
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the implementations described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 2:
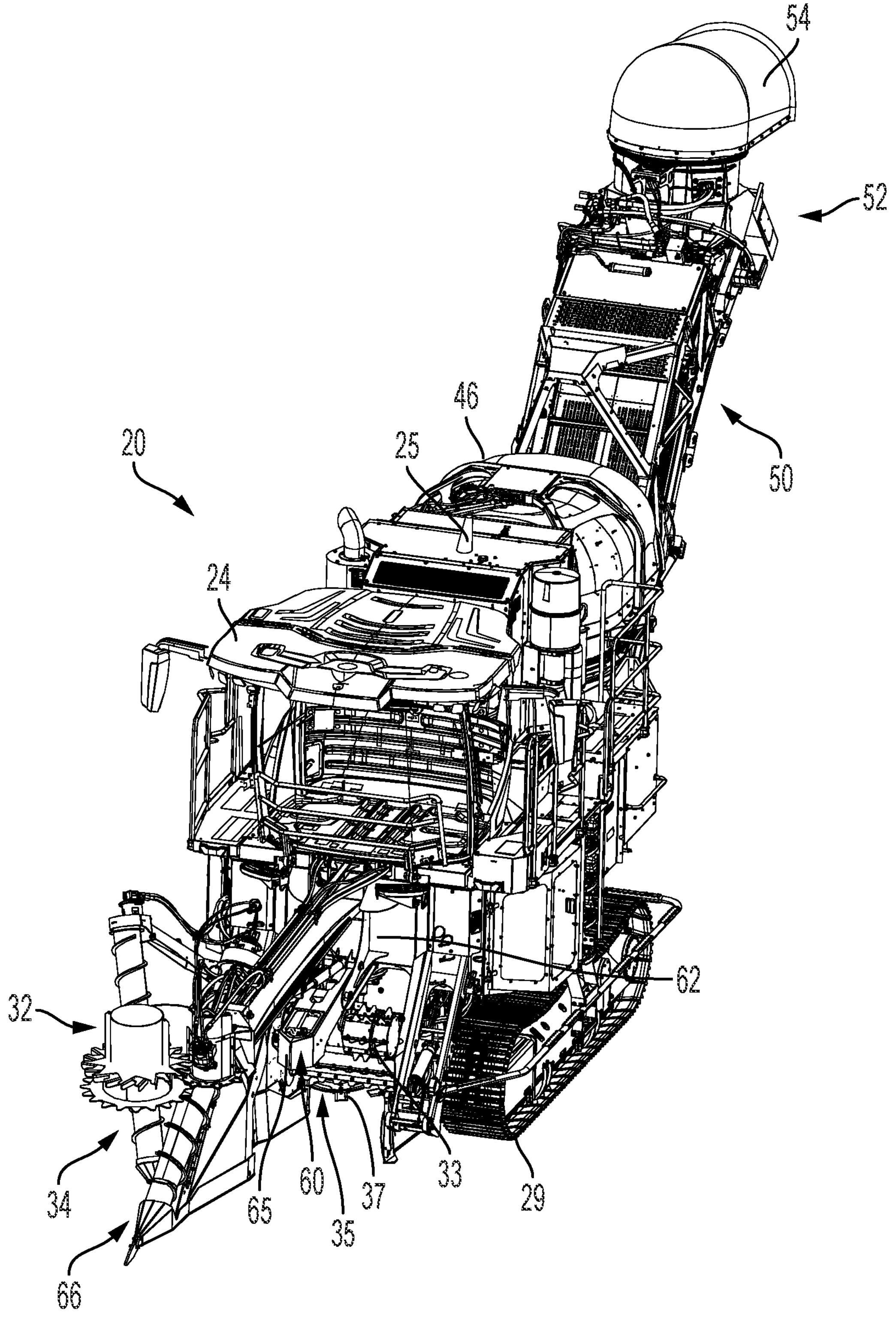
FIG. 2 illustrates a partial front perspective view of a sugarcane harvester.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a frame 26 that is supported by wheels 28, or tracks 29 as illustrated in FIG. 2. These ground engaging traction devices are configured to move the harvester along rows of sugarcane 22. The wheels 28 or tracks 29 are supported by an adjustable suspension, known by those skilled in the art, which adjusts the frame height with respect to the ground. A transmission, not shown, drives the wheels 28 or tracks 29, as is understood by one skilled in the art.

An antenna 25 is located on the cab 24. The antenna 25 is configured to receive and to transmit wireless signals to and from an externally located source of data information, such as is available over the web through a cloud system, or to and from a global positioning system (GPS) 27 (see FIG. 5) which is configured to transmit and/or receive location information of the harvester 20. In addition, the GPS system 27 is configured to transmit and/or receive machine control information to/from a harvester controller 104 of FIG. 5. In different implementations, for instance, the GPS system 27 provides harvester status information including, but not limited to, harvester location, harvester ground speed, the current operating state of the transmission, and the height of a cutting blade with respect to ground or the ground surface. In different implementations, for instance, the GPS system 27 directs the harvester 20 through the field along a predetermined path to provide for harvesting. Other machine functions are contemplated. In some implementations, the harvester 20 is a fully autonomous or semi-autonomous vehicle in response to harvester control signals transmitted by the GPS system.

An engine, located within a housing 30, drives the transmission that moves the wheels 28 or tracks 29, along a field to continually cut the sugarcane 22 for harvesting. In different implementations, the engine also powers various driven components of the harvester 20. In certain implementations, the engine directly powers one or more hydraulic pumps (not shown) and other driven components powered by the hydraulic motors via an embedded hydraulic system (not shown). In one or more implementations, a ground speed is provided and identified by a ground speed device, including but not limited to, the GPS system, the transmission, wheel speed sensors, or track sensors. Other ground speed devices are contemplated, each of which identifies the speed of the harvester as it moves through the field.

A cane topper 32 extends forward of the frame 26, from a front portion thereof, in order to remove the leafy tops of sugarcane plants 22 as the frame 26 moves in a forward direction 31, to the right as illustrated. A set of crop dividers 34 guides the stalks of sugarcane toward internal mechanisms of the harvester 20 for processing.

As the harvester 20 moves across a field, sugarcane plants 22 passing between the crop dividers 34 are deflected downward by one or more knockdown rollers 33 before being cut near the base of the plants 22 by a base cutter assembly 35, as would be understood by one skilled in the art. Rotating cutter disks or blades 37, guides, or paddles on the base cutter assembly 35 further direct the cut ends of the plants rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different implementations, includes a fan assembly including a powered fan to clean the billets and to extract the crop residue, trash, and debris from the cleaning chamber 44. A loading elevator 50 extends from a rear portion of the frame 26 and has one end located at the bottom of the cleaning zone 44. The elevator 50 conveys the cleaned billets upward to a discharge location 52, below a secondary extractor 54, where the billets are discharged into a truck, a wagon, a container, or other receptacle that collects the discharged billets. The secondary extractor 54 separates the crop residue from the cut stalk to clean the cut stalk.

FIG. 2 illustrates a partial front perspective view of the harvester 20. As is understood by one skilled in the art, the cane topper 32 and the crop dividers 34, each include substantially identical and mirror imaged components that are located on either side of the sugarcane crop that is directed into the harvester 20 by the cane topper 32 and the crop dividers 34. In FIG. 2, the right side components of the cane topper 32 and crop dividers 34 are not shown to illustrate a portion of the base cutter assembly 35, including a single cutter 37 (cutting head), and the knockdown rollers 33. In addition, the harvester 20 includes a radar support structure 60 coupled to a frame member 62 of the harvester 20. See also FIG. 3.

Figure 3:
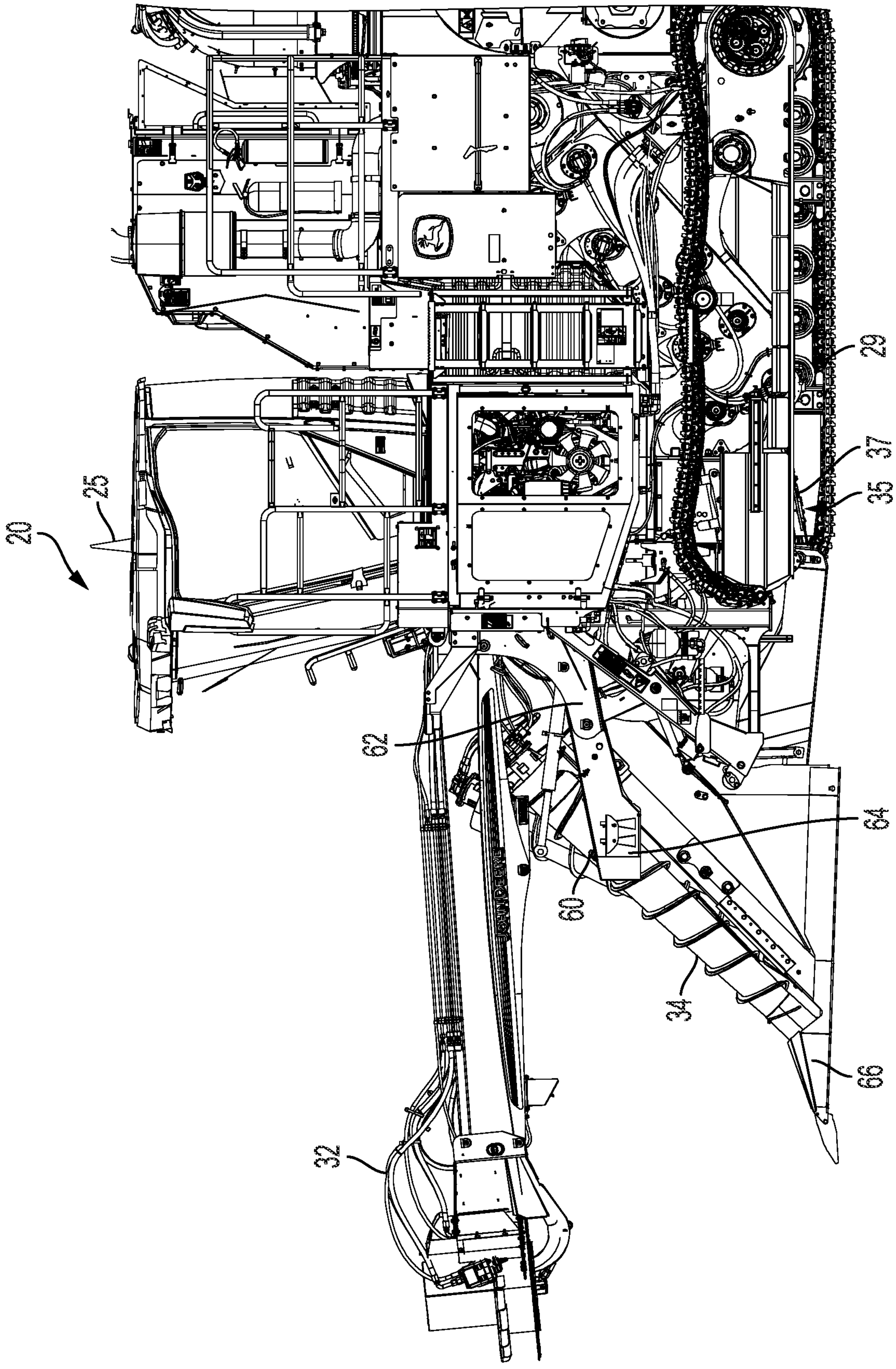
FIG. 3 illustrates a partial side view of a sugarcane harvester.
Figure 4:
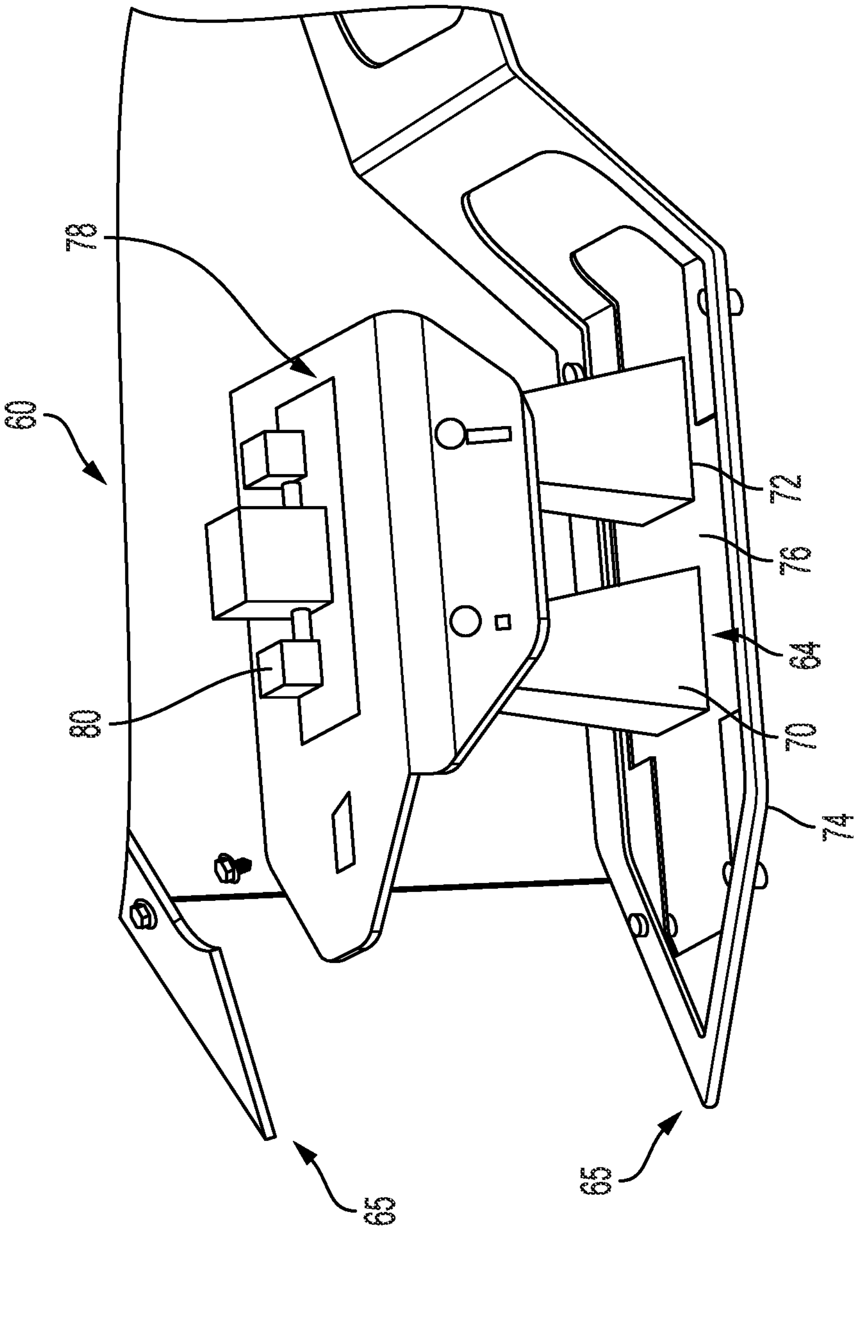
FIG. 4 illustrates a cutaway partial view of a radar sensor assembly.

The radar support structure 60 supports a radar sensor assembly 64 that is substantially centrally located along a centerline of the harvester 20 as it moves in a forward direction. As seen in FIG. 3, the radar sensor assembly 64 is located in a forward position, or in front of the cutter assembly 35, but behind a front portion 66 of the crop dividers 34. A front end 65 of the structure 60, as seen in FIG. 2 and FIG. 4, includes a leading bow having inclined sides extending from a single substantially vertical edge to direct debris away from the support 60. The radar sensor assembly 64 is used to identify a ground surface height with respect to and in front of the cutting blade 37 based on a sensed ground plane. The plane is established by a ground surface. By imaging the ground surface with radar signals transmitted by the radar assembly, a leading signal for a control system 100 is provided. The leading signal provides a forward looking sensing detection scheme to adjust the cutting height of the cutting blade in anticipation of changes in the ground plane as the vehicle 12 moves forward. In one implementation, the radar sensor assembly 64 is fixed at a predetermined position with respect to the frame. In another implementation, the position of the radar sensor assembly is adjustably moveable relative to the frame to be fixed at different locations. As long as the adjusted position is known and understood, the position of the sensor is known vs. the cutting blade and a distance of the blade to ground is determinable.

The radar sensor assembly 64, and the processing system to which the sensor is connected, provides a non-contacting radar based ground detection system. The ground detection system provides a mechanism to automate a cutting height of the sugarcane by adjusting the height of the cutter assembly 35 and the blades 37. Electromagnetic waves, i.e. signals, transmitted by the radar sensor assembly 64, penetrate obstructions between the sensor assembly and the ground surface, and provide an accurate determination of ground surface location with respect to the cutter assembly 35. The electromagnetic waves penetrate crop material, dust, water, fog, precipitation, any crop i.e., canopy, juice, residue, but not the ground. In addition, the radar sensor assembly 64 detects obstructions, such as rocks, located between the sensors and the ground. Electromagnetic waves include radio waves, microwaves, infrared waves, optical waves, ultraviolet waves, x-rays and gamma rays. As described herein, the radar assembly utilizes electromagnetic radio waves which are reflected from the ground and rocks, but which penetrate other materials thereby providing an accurate identification of a ground level of the ground.

A non-contact sensing radar system includes a controller to identify a distance between the base cutter 35 and the ground surface. In one or more implementations, the sensing radar system utilizes electromagnetic waves, which includes in different implementations, the use of different types of radar sensors, to measure the distance from the radar sensor assembly to the ground. Once the distance from the radar sensor assembly 64 to the ground is determined, the distance between the cutter assembly 35 and ground surface is determined. Using this determined distance, a cutting height of the cutter assembly 35 is set to a preferred height. While distance to ground is used in this application, radar systems, including radar receivers and transmitter often are described as including range to ground.

In one implementation, the height of the cutting blade 37, and its cutting angle, i.e. 14 degrees, with respect to the vehicle frame, is fixed with respect to the frame of the harvester 20. To adjust the height of the cutting blade 37, the vehicle suspension includes an adjustable height suspension which moves up or down with respect to ground. Consequently, cutter position is adjusted by adjusting suspension height. In another implementation, the cutting blade 37 is connected to a cutter support assembly which is independent of and adjustable with respect to the frame of the harvester. In this implementation, the harvester suspension is not adjusted to adjust cutting blade 37 height, but the cutter support assembly moves with respect to the harvester frame to adjust cutting blade height.

FIG. 4 illustrates a cutaway partial view of the radar sensor assembly 64 including a first radar horn antenna 70 and a second radar horn antenna 72, each of which is located next to a bottom portion of the radar support structure 74. In one implementation, each of the first and second horn antennas 70 and 72 is supported above or are in contact with a planar sheet 76, i.e. radome, made of radar transparent material. In one or more implementations, the radar transparent material includes, but is not limited to, a polycarbonate material such as Lexan, plastic, or glass. The use of the polycarbonate material enables the transmission and reception of the electromagnetic waves, while providing protection from debris that can move toward the radar sensor assembly 64 during harvesting.

Each of the first and second horn antennas 70 and 72 is spaced apart and held in position by an upper support structure 78, that further supports an electrical circuit 80 coupled to the horn antennas 70 and 72. In one implementation one of the first and second horn antennas is a transmit antenna, i.e. transmitter, and the other of the first and second horn antennas is a receive antenna, i.e. receiver. As the harvester 20 moves in a forward direction when cutting sugarcane, the transmit antenna transmits electromagnet waves from the radar sensor assembly 64 toward the ground and the receive antenna receives reflected electromagnetic waves reflected from the ground in response to the transmitted electromagnetic waves. Due to the nature of the transmitted electromagnetic waves, the area at ground level being sensed, i.e. impinged by the transmitted waves, is larger than the area of the transmitted electromagnetic wave at the point of transmission from the transmit horn antenna. By sensing a larger area at ground level, the radar system is forward looking such that the ground level at the cutting blade 37 is determined prior to it reaching the cutting blade 37. In one implementation, the sensors 70 and 72 have a range of frequency from 900 MHz to 24 GHz. In another implementation, the center frequency of the transmitted waves is 7 GHz. Adjustable center frequencies are also contemplated. In one implementation, the radar antenna is a synthetic aperture radar (SAR) array. In other implementations, the radar sensor includes different shaped horns or oscillating horns. The distance between the receive radar antenna and transmit radar antenna is based on the capabilities of different radar systems is variable and includes distances of from millimeters to meters.

The radar sensor assembly 64 provides a non-contact sensing system to measure the distance to the ground surface for a crop harvester. In one implementation, the distance of the ground surface from the radar sensor assembly 64 is based on a period of elapsed time between transmission of the radar signal from one of the horn antennas to receipt of the reflected radar sensor at the other horn antenna. In another implementation, the distance to the ground surface is based on a phase shift between the transmitted signal and the received signal.

The sensing system utilizes electromagnetic waves to measure the distance from the radar sensor 64 to the ground. By identifying the distance from the radar sensor 64 to ground, the location of the base cutter 35 with respect to ground is identified.

Figure 5:
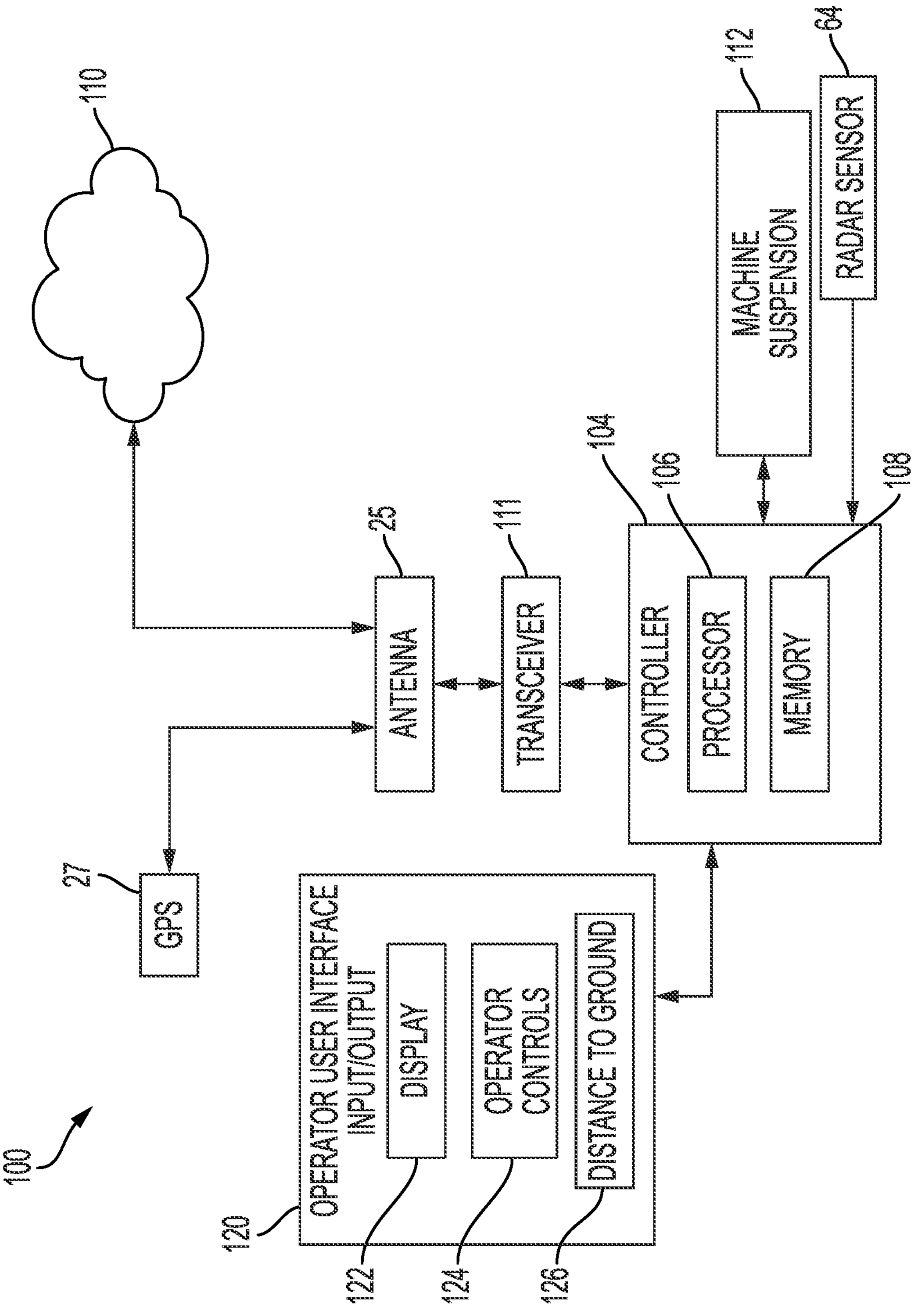
FIG. 5 illustrates a schematic block diagram of a control system for a harvester.

FIG. 5 illustrates a schematic block diagram of a control system 100 configured to determine a cutting height of the sugarcane when harvested. The control system 100 includes one or more electronic controllers 104, also known as an electronic control unit (ECU), each of which is connected to a controller area network (CAN) bus (not shown) of the harvester 20 and to the various devices, systems, parts, or components of the harvester 20. The CAN bus is configured to transmit electric signals for the control of various devices connected to the bus, as well as to determine status signals that identify the status of the connected devices.

The controller 104, in different implementations, includes a computer, computer system, or other programmable devices. In these and other implementations, the controller 104 includes one or more processors 106 (e.g. microprocessors), and an associated memory 108, which can be internal to the processor or external to the processor. The memory 108 includes, in different implementations, random access memory (RAM) devices comprising the memory storage of the controller 104, as well as any other types of memory, e.g., cache memories, non-volatile or backup memories, programmable memories, or flash memories, and read-only memories. In addition, the memory, in different implementations, includes a memory storage physically located elsewhere from the processing devices, and can include any cache memory in a processing device, as well as any storage capacity used as a virtual memory, e.g., as stored on a mass storage device or another computer coupled to controller 104. The mass storage device can include a cache or other dataspace which can include databases. Memory storage, in other implementations, is located in a cloud system 110, also known as the "cloud", where the memory is located in the cloud at a distant location from the machine to provide the stored information wirelessly to the controller 104 through the antenna 25 operatively connected to a transceiver 111, which is operatively connected to the controller 104. When referring to the controller 104, the processor 106, and the memory 108, other types of controllers, processors, and memory are contemplated. Use of the cloud 110 for storing data, in one implementation, leads to storage economies of scale at a centrally located operation's center, where data from a large number of harvesters is stored. In other implementations, data from other types of work machines is stored.

The controller 104 executes or otherwise relies upon computer software applications, components, programs, objects, modules, or data structures, etc. Software routines resident in the included memory 108 of the controller 104, or other memory, are executed in response to the signals received from the radar sensor assembly 64 which is located on, at or within the harvester 20 as described herein. The controller 104 also receives signals from other controllers such as an engine controller and a transmission controller. The controller 104, in other implementations, also relies on one or more computer software applications that are located in the "cloud" 110, where the cloud generally refers to a network storing data and/or computer software programs accessed remotely, such as local cloud functionality not connected to the internet, or mesh networking among machines. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

An operator user interface 120 is operatively connected to the controller 104 and is located in the cab 24 to display machine information to an operator or user, as well as to enable the user to control operations of the harvester 20. The user interface 120 includes a display 122 to display status information directed to the condition or status of the harvester 20. Status information includes, but is not limited to, the operating status of a machine suspension 112 as well as the signals transmitted and received by the radar sensor 64. The user interface 120 further includes operator controls 124 configured to enable the user to control the various functions and features of the machine suspension 112, or other machine operating systems. A distance to ground user interface 126 is located at the user interface 120 and provides one or more functions. Such functions include, but are not limited to, a display of a current distance between the ground and the cutter 37 of the base cutter assembly 35. In some implementations, the user interface 126 includes one or more operator controls which are configured to manually adjust the distance between the cutter 37 and the ground.

Other work machines, known as autonomous machines, are controlled remotely without operator or user intervention at the machine itself. In such a system, a remote control system is used to remotely control operation of the harvester 20 through web-based communication tools and platforms with the cloud 110, as is understood by those skilled in the art. In one implementation, an operator, user, or manager is located at a remote control system, which due to its cloud communication protocol, is located remotely from the harvester 20. In such an implementation, the control system 100 is a distributed control system having components located at one or more of the work machines, the cloud, and the remote control system.

Figure 6:
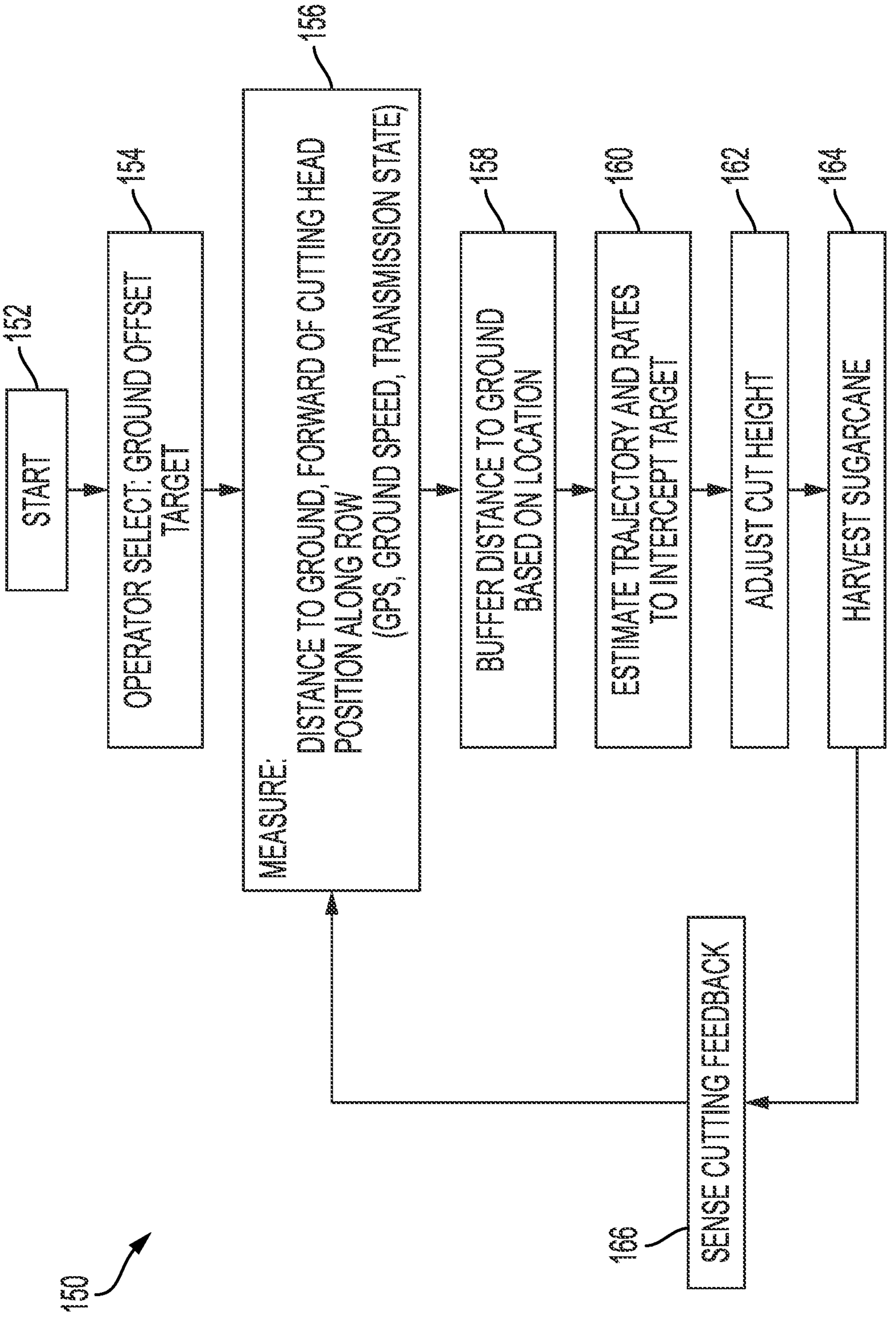
FIG. 6 illustrates a block diagram of a process for a radar based cutting height system for the sugarcane harvester.

FIG. 6 illustrates a block diagram of a process 150 of the radar based cutting height system for the sugarcane harvester. The process 150 begins at start block 152 after which the user selects a cutting height to establish a ground offset target at block 154. The ground offset target establishes a cutting height of the cutting blade 37 with respect to the ground surface. The selectable cutter height is determined by the user, or another individual, based on the type or condition of soil in which the sugarcane is planted or based on a cutting height determined by user experience. Once the user determines a preferred height, the user sets a target height through the operator controls 124, which enable the user to scroll up or down to set the target height, in one implementation. In other implementations, the user selects the height using the controls 124 that display a number of predetermined height selections that are selectable though predefined buttons.

Depending on the location in which the sugarcane is grown, the desired height is selected based on the location of the sugarcane being harvested. For instance, in one location, the cutting height is set to one inch above ground. In another locations, the cutting height is set one inch below ground. In both cases, the radar sensor assembly 64 identifies a ground surface and the machine adjusts the cutter height accordingly based on the selected height. In another location, such as Australia, the cutter height is adjusted to a minus one inch, i.e. one inch below ground level.

Once the height is selected at block 154, also known as a ground offset target, the controller 104 determines the distance to ground using the radar sensor assembly 64. In one implementation, this initial distance to ground is determined in front of the cutting blade 37, but behind the front portion 66 of the crop dividers 34. In other implementations, the sensor assembly 64 is located before the crop dividers 34, such as attaching the sensor assembly 64 to the topper 32. The initial distance to ground is determined by the actual distance of the cutting blade 37 with respect to ground, which is then adjusted during a harvesting operation taking into account one or more of: 1) the selected height identified by the operator, 2) a location of the harvester 20, 3) an expected ground speed, and 4) an operating state of the transmission. One or more of these elements is used to determine, at block 158, a buffer distance to ground height value is based on a location of the harvester 20 within a field is determined. The determined value, which is updated on a continuing basis, controls and adjusts the distance of the blade 37 to the ground surface as the vehicle travels through the field.

The controller 104 at block 158 measures the distance to ground and buffers, or stores, the height value, i.e, data, in memory based upon the distance from the measured value to the cutter(s) along the row. For example, as the machine moves along the row, the controller receiving signals from the sensor assembly 64, identifies the distance to ground and stores that distance as first element in a series of elements, representing a distance that is zero meters along the row. In one implementation, the machine moves forward by one meter along the row as measured by the propulsion system of the GPS system. The distance to ground at the one meter location is then measured and stored as a second element in the series of elements. The second element represents the distance to ground one meter further down the length of the row. This process is repeated by continually updating the second element one meter further along the row. As the machine reaches a further distance along the row (the one meter distance in this implementation), the machine knows how far the sensor is in front of cutting blades. Based on this identified distance, the machine identifies where the ground is as the machine moves forward along the row and adjusts the position of the cutting blades as necessary. While the one meter distance is used in this implementation, other distances are contemplated.

Once the location of the harvester 20, the expected ground speed, and/or the state of the transmission is identified, the trajectory of the harvester is estimated and is used by the controller 100 to automatically adjust the height of the blade 37 with respect to the ground surface at block 160. The controller 100, using this information, identifies or estimates the trajectory or path of the harvester and the rate or time period at which the target, i.e. sugarcane cutting height, it to be reached by the cutting blade 37. For instance, if the terrain of the field is relatively level, the speed of the harvester may be greater than the speed of the harvester if the terrain is more uneven or hillier. The controller 160 adjusts height of the blade 37 continuously as the vehicle moves through a field. The rate of adjustment of the height of the blade 37 is determined by the controller based, in part, on the speed of the vehicle. By continuously adjusting the blade height, large variations in cutting height of the sugarcane stalks are avoided. By doing so, more sugarcane stalk is harvested which increases productivity. For a relatively level field, adjustments of blade height typically occur less often. If, however, the terrain is more hilly, the blade height may be adjusted more rapidly when compared to traveling a relatively level field. Using this information, the controller 104 adjusts blade height, or cut height, at block 162. As the vehicle continues to move through the field, the sugarcane is harvested at block 164 while maintaining a relatively consistent cutting height at which the sugarcane is harvested. The system, in at least one implementation, includes a pre-definable or runtime configurable setting, for a target offset from the ground. In one or more implementations, the system begins with a default cut height. In this or other implementations, the value of the cut height is adjustable during operation.

The relatively consistent cutting height is maintained by the controller 104 by constantly monitoring blade height as determined by the controller 104 at block 166. In other implementations, monitoring of blade height with respect to ground occurs at discrete periods of time, such as every five seconds. If the cutting height changes, the controller 104 adjusts the height of the machine suspension to maintain the selected ground offset target at block 154. In one implementation, the controller 104, using the ground speed of the harvester 20, identifies a time of flight (TOF) between the radar sensed ground plane and the cutting blade, to adjust the blade height. In one implementation, the ground speed is used to determine the distance along a row to buffer data spatially, rather than temporally. In another implementation, the controller 104 receives status signals from a motor driving the cutting blades 37. If motor pressure increases, the controller 104 determines that the cutting blade height is too low, which is raised to reduce the motor pressure. Response time of suspension adjustment is also used by the controller 104 is used to determine where and/or when the cutting blade(s) reach the targeted ground height. As the machine is moving along the row and the machine suspension is being adjusted, a vector of motion is determined for the forward motion of the basecutter blades. This vector of motion is used by the controller to determine when the blades intersect the cutting height at the ground in front.

Figure 7:
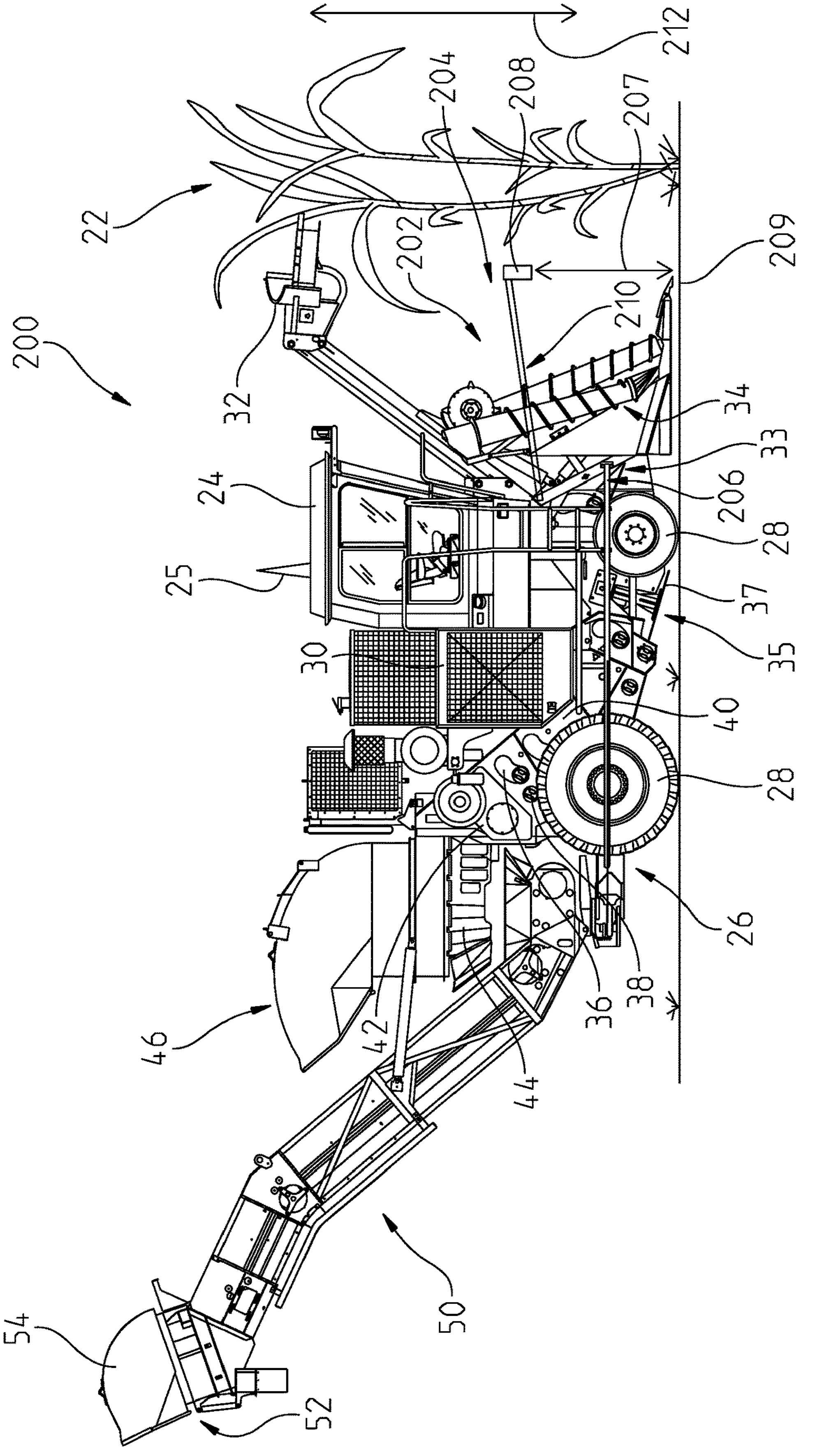
FIG. 7 illustrates a side elevational view of another implementation of a sugarcane harvesting machine including a crop gathering apparatus with a mounted radar for ground detection and active crop gathering apparatus control.

FIG. 7 illustrates an elevational side view of another implementation of harvesting machine, and more particularly to a sugarcane harvesting machine 200. Please see FIG. 1 for additional details of a sugarcane harvesting machine. As seen in FIG. 7, corresponding reference numbers indicate corresponding features or parts of FIG. 1. As seen in FIG. 7, corresponding reference numbers indicate corresponding features or parts of FIG. 1.

The sugarcane harvesting machine 200 includes a crop gathering apparatus 202 with a radar assembly 204 for ground detection and active crop gathering apparatus control. The crop gathering apparatus 202 includes the cane topper 32 which extends forward of the frame 26, from a front portion thereof, in order to remove the leafy tops of sugarcane plants 22 as the frame 26 moves in a forward direction 31, to the right as illustrated. The set of crop dividers 34 guides the stalks of sugarcane toward internal mechanisms of the harvester 20 for processing. The crop gathering apparatus 202 includes the base cutter assembly 35 where rotating cutter disks or blades 37, guides, or paddles on the base cutter assembly 35 further direct the cut ends of the plants rearward within the harvester 20. As used herein, "crop gathering apparatus", "crop gatherer", or "crop gathering" includes both the gathering of crop prior to being removed from a stalk, the gathering of crop prior to being cut from a field, and the cutting of crop from a field.

The harvester 200 includes a base cutter suspension actuator 206 operatively connected to the crop gathering apparatus 202, also known as a gathering head, which adjusts a position of the cutting blade 37 as well as a position of crop dividers 34. The crop gathering apparatus 202 includes The radar assembly 204 includes a radar assembly 208 which is coupled to a radar support 210. The radar support 210 is operatively connected to the base cutter suspension actuator 206 and moves with respect to the frame 26 in a generally vertical direction 212. Consequently adjustment of a height of the cutting blades 37, which move vertically with respect to ground, also adjusts a vertical position of the radar assembly 208. In one implementation, as illustrated, the radar assembly 208 includes a line of sight 207 directed to a front end 209 of the crop dividers 34. In some implementations, the radar assembly includes one or more of a radar transmitter, a radar sensor, and a radar receiver. Cutters as described herein include but are not limited to cutterbars or knives.

As described herein, the radar assembly 208 transmits a radar signal toward the ground and receives a reflected radar signal that includes ground location information, crop information, other vegetation information. The transmitted radar signal is directed toward the front end 209 of the crop gathering apparatus, and in different implementations, the transmitted radar signal is directed in front of the front end 209. The line of sight of the transmitted radar signal is considered to include a central axis of the transmitted radar signal, which includes an expanding field of view about the central axis of the radar signal. In one implementation, as illustrated, the radar assembly 208 is directed in a downward position such that the central axis of the transmitted radar signal inclined at approximately 90 degrees with respect to ground. In this implementation, due to the nature of the transmitted radar signal, the transmitted radar signal includes a forward looking field of view. In one implementation, the height of the radar assembly 208 is approximately 2 meters or less above ground. By placing the radar assembly 0.1 meters to 2 meters above ground or 0.5 meters to 2 meters above ground, functionality and accuracy is improved. In another implementation, the radar assembly 208 is adjusted to be provide an expanded forward looking view of the approaching terrain, with the central axis directed at approximately up to 45 degrees with respect to ground.

In other implementations, the radar assembly 208 includes separate devices, a radar transmitting device for transmitting a radar signal, and another device, a radar receiver, that receives a reflected radar signal. The reflected radar signal includes information that identifies the location of front end 209 with respect to ground including a distance between the ground and the front end 209. The distance between ground and the front end 209 is identified by a control system as described herein. The identification of this distance enables the controller to adjust a position of the front end 209 with respect to ground to optimize harvesting of the sugarcane.

The reflected radar signal includes information that distinguishes between different types of crop and moisture content of the crops being imaged. Moisture content is determined based on crop attenuation characteristics and signal content of the reflected radar signal. Other vegetation, such as weeds or undesirable undergrowth, is also identified. Ground levels with respect to crop location and growth is detected and filtering of undergrowth and vegetation below or intermingled with crop being harvesting and/or cut is also identified. The ability to "see" the ground through the crop enables proactive adjustments of the position of the front end 209, or in other implementations, the position of the gathering head or crop cutters, rather than being reactive.

Figure 8:
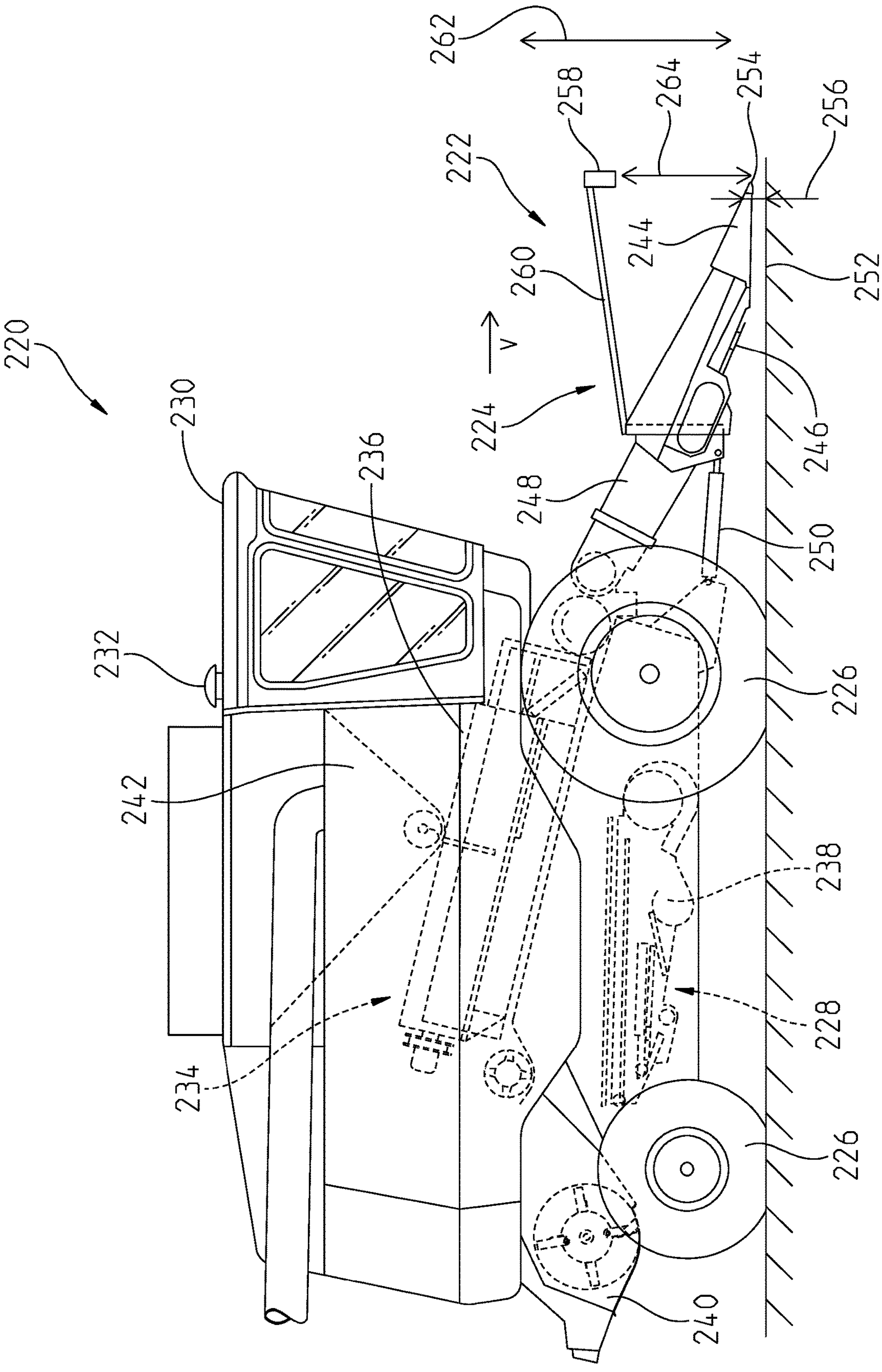
FIG. 8 illustrates a side elevational view of a work vehicle, and more specifically a corn harvesting machine including a crop gathering apparatus with a mounted radar for ground detection and active crop gathering apparatus control.

FIG. 8 illustrates a side elevational side view of another implementation of a harvesting machine, and more particularly to a corn harvester 220. The corn harvester 220 includes a crop gathering apparatus 222 with a radar assembly 224 for ground detection and active crop gathering apparatus control. The corn harvester 220 includes wheels 226 for moving the harvester along the soil or ground of a field in the direction V. In other implementations, the corn harvester 220 includes tracks. The wheels 226 support a frame 228 which supports a cab 230 for an operator. An antenna 232 is located at a top of the cab 230 and is configured to receive and transmit wireless communication signals to and from the cab 230 when required. The frame 228 further supports a crop processing apparatus 234 which includes a threshing/separating apparatus 236 for removing kernels of corn from corn ears as well as removing crop debris from the harvested corn ears. Crop debris that may include leaves, corn stalks, portions of corn stalks, rocks and other debris are processed by a cleaning crop assembly 238. Once processed, the crop debris is moved to a crop debris discharge assembly 240. At the same time, corn kernels separated from corn ears fall through to a clean grain area to be conveyed and stored in a grain tank 242. Once a sufficient amount of kernels are located in the grain tank 242, the kernels are discharged by an unloading system to a grain device, such as a wagon which moves through the field with the harvest or to an externally located storage facility.

The crop gathering apparatus 222, used for corn, is generally known as a corn header and includes a row of snouts or dividers 244 wherein the row of snouts extends generally perpendicular to the moving direction V of the harvester 220. One snout 244 is illustrated. The snouts are spaced apart along the row and each space is configured to receive one row of stalks of corn extending along the moving direction V. The corn header further includes gathering chains 246 which remove the crop, i.e. corn ears, from the corn stalks and act as a crop remover. Once the ears are removed, the ears are moved by a slope conveyor 248 to the crop processing apparatus 234.

A lift cylinder 250, such as a hydraulic cylinder, is operatively connected to the frame 228 and to the corn header 224, to raise and lower the corn header 224 with respect to ground, here identified as ground plane 252. Prior to and during harvesting of corn, a height of the row of snouts 244 between the ground plane 252 and a tip 254 of the snout is adjusted to a preferred height 256.

The radar assembly 224 includes a radar sensor device 258 which is coupled to a radar support 260. The radar support 260 is operatively connected to the corn header 224 and moves with respect to the frame 228 in a generally vertical direction 262 with movement of the corn header 224. Consequently adjustment of a height of the corn header 224, which move vertically with respect to ground, also adjusts a vertical position of the radar sensor device 258. The radar sensor device 258 include a line of sight 264 which is directed towards the snout 244.

Figure 9:
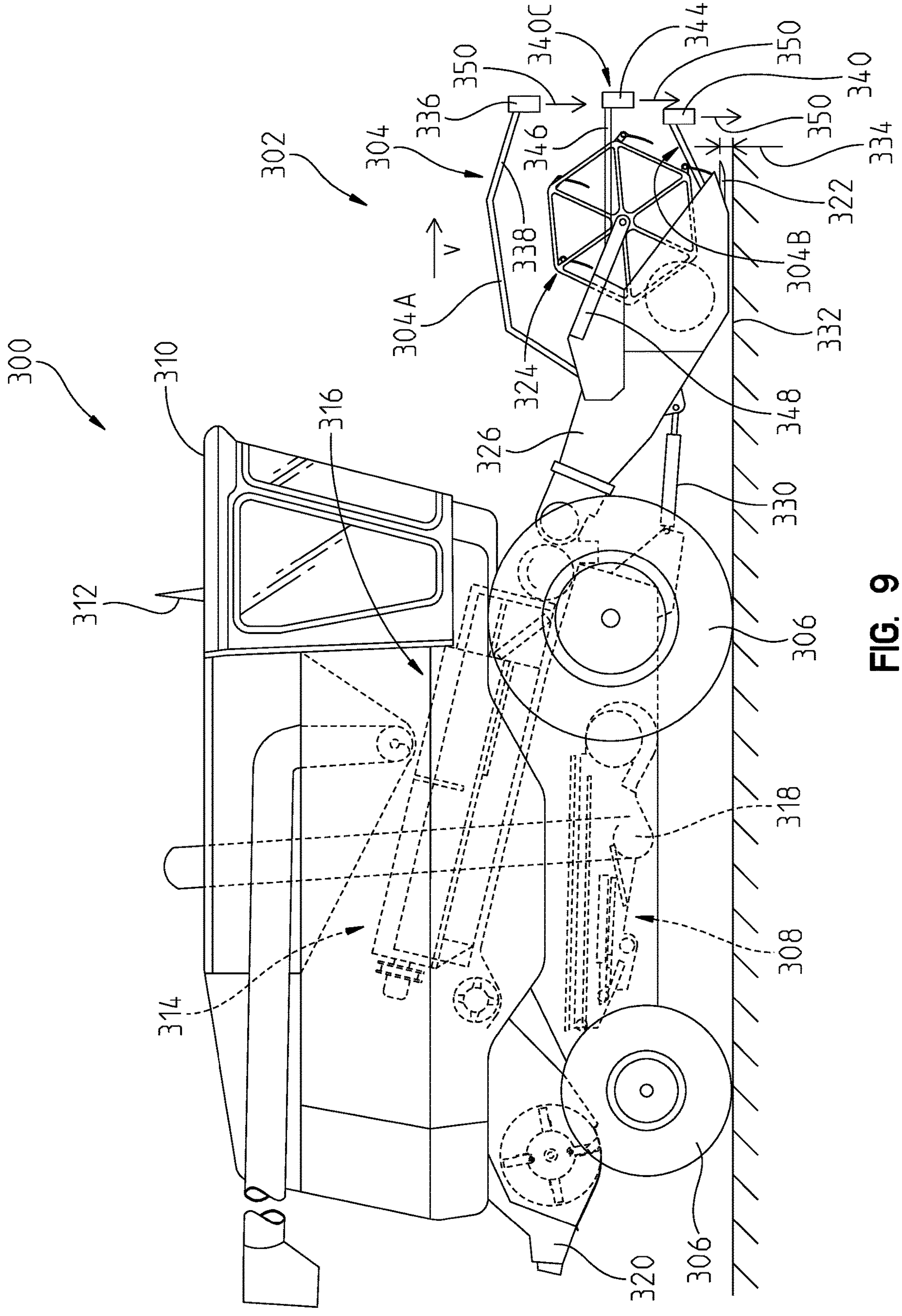
FIG. 9 illustrates a side elevational view of a work vehicle, and more specifically a grain harvesting machine including a crop gathering apparatus with a mounted radar for ground detection and active crop gathering apparatus control.

FIG. 9 illustrates a side elevational side view of another implementation of harvesting machine, and more particularly to a grain harvester 300. The grain harvester 300 includes a crop gathering apparatus 302 with a radar assembly 304 for ground detection and active crop gathering apparatus control. The grain harvester 300 includes wheels 306 for moving the harvester along the soil or ground of a field in the direction V. In other implementations, the grain harvester 300 includes tracks. The wheels 306 support a frame 308 which supports a cab 310 for an operator. An antenna 312 is located at a top of the cab 310 and is configured to receive and transmit wireless communication signals to and from the cab 310 when required. The frame 308 further supports a crop processing apparatus 314 which includes a threshing/separating apparatus 316 for removing grain, such as wheat, from grain stalks as well as removing crop debris from the harvested grain. Crop debris, that may include leaves, stalks, portions of stalks, rocks and other debris, is processed by a cleaning crop assembly 318. Once processed, the crop debris is moved to a crop debris discharge assembly 320. At the same time, grain separated from the stalks is moved to and stored in a grain tank 322. Once a sufficient amount of grain is located in the grain tank 322, the grain is discharged by an unloading system to a grain device, such as a wagon which moves through the field with the harvest or to an externally located container or storage facility.

The crop gathering apparatus 302, used for grain, is generally known as a grain header and includes a sickle or a row of cutters 322, wherein the row of cutters 322 extends generally perpendicular to the moving direction V of the harvester 300. One cutter 322 is illustrated. The cutters are spaced apart along the rows. The grain header 302 further includes a reel 324 which moves cut grain stalks into a feeder portion 326 of the header 302. Once the grain is removed from the stalks, the grain is moved by the feeder portion 326 to the crop processing apparatus 314.

A lift actuator 330, such as a hydraulic cylinder, is operatively connected to the frame 308 and to the header 302, to raise and lower the header 302 with respect to ground, here identified as ground plane 332. Prior to and during harvesting of grain, a height of the row of cutters 322, between the ground plane 332 and the cutters 322, is adjusted to a preferred height 334.

FIG. 9 illustrates multiple configurations of the radar assembly 304. In a first implementation, radar assembly 304A includes a radar assembly 336 operatively connected to a radar support 338. The radar support 338 is coupled to the grain header 302 and moves with movement of grain header 302 in response to activation of the lift cylinder 330. In a second implementation, radar assembly 304B includes a radar assembly 340 operatively connected to a radar support 342 coupled to the grain header 302 at a location more closely located to the cutter 322. In a third implementation, radar assembly 304C includes a radar assembly 344 operatively connected to a radar support 346. In this implementation, the radar support 346 is coupled to a reel assembly that supports the reel 324. The reel 324 is locatable between different positions by a reel arm 348 which raises and lowers the reel 324. This adjustability accommodates different heights of grain or grain/grain stalks that have different moisture content. In each of the implementations 304A, 304B, and 304C, each radar sensor 336, 340, or 344 includes a line of sight 350 directed to and at or forward of the cutter 322. Consequently adjustment of a height of the grain header 302 or adjustment of a height of the reel 324, adjusts a vertical position of the radar sensor devices.

Each of the harvesters of FIGS. 7, 8, and 9 includes a radar assembly including a radar transmitter and radar supported by a radar support. In each implementation, the radar sensor is located in a forward position with respect to the harvester frame and more particularly the radar sensor is located ahead of a gathering location of each of the headers. For instance, in FIG. 7, the radar assembly 208 is directed toward or pointed in a downward direction toward the front end 209 of the crop dividers 34. In FIG. 8, the radar assembly 258 is directed to or pointed in a downward direction toward the nose 246 and in front of an entrance to the gathering chain assembly 246. Likewise in FIG. 9, each of the radar assemblies 336, 344, or 350 is directed toward the cutter 322. While each of the implementations illustrates the direction of a sensor signal to be directed to a gathering feature, such as the nose 244 of the corn harvester of FIG. 8, or the cutter 334 of FIG. 9, in different implementations, the vertical position of the radar assembly with respect to each of the crop gatherers is in a forward position of 0.5 meters to 3 meters. In one implementation, the radar assembly is pointed vertically down. In addition, a height of the assemblies, and in particular the radar transmitter, above the ground plane includes a placement of up to a distance of approximately two (2) meters. In one or more implementations, an adjustment mechanism is coupled to the support arm and to the radar assembly to enable the radar assembly to be directed to a desired position.

The use of a forward looking radar sensor arrangement provides a forward looking field of view. By sensing the terrain which includes variations in the ground plane, crop harvesting operations are determined proactively forward of or ahead of the agricultural machine. Harvesting performance is consequently improved by adjustment of a gathering header of gathering attachment based on anticipated crop conditions, ground condition, or ground terrain.

Radar placement with respect to the crop gatherers also depends on the type of radar transmitting device being used. For instance, different types of radar transmitting devices have different beam widths and the location of the radar device with respect to the crop gatherer can be based on beam width. In one implementation, a ground penetrating radar (GPR) transmitter is used which includes a narrow band of approximately 0.5 gigahertz (GHz) to 3 GHz. In another implementation, an ultra-wide band (UWB) radar transmitter is used to provide a frequency range of 3 GHz to 15 Ghz. UWB radar (3-10 GHz), for instance, assists in overcoming challenges of visibility in dusty conditions, penetrating crop canopy, and providing proactive input to machine adjustments. Lower bandwidth sensing solutions, for instance 1-15 GHz, provides increased accuracy. In a further implementation, a fixed frequency radar signal is used. The use of ground penetrating radar enables the radar to penetrate crops that include varying moisture content, but also separates weeds and undergrowth from crop and ground.

To accommodate radar placement with respect to the support arm, one or more implementations include a mechanical adjustment mechanism connecting the radar to the support arm. In this implementation, the adjustment mechanism is physically adjusted by a user. In other implementations, an electrically actuated actuator is coupled to the sensor support arm or to the radar assembly to adjust an angular position of the assembly. For instance, the radar assembly can be directed to a forward looking position with angles up to 45 degrees with respect to vertical. In other implementations, the forward looking position includes angles of up to 30 degrees with respect to vertical. Focusing the forward viewing angle to less than 30° from vertical reduces the signal scattering impact to improve accuracy. Forward-looking sensor placement enables sensor output to control reaction time. In different implementations, the adjustment mechanism provides for pivoting, actuating, or rotating a mounted support coupled to the support arm or radar to enable positioning of sensor in harvest mode.

Figure 10:
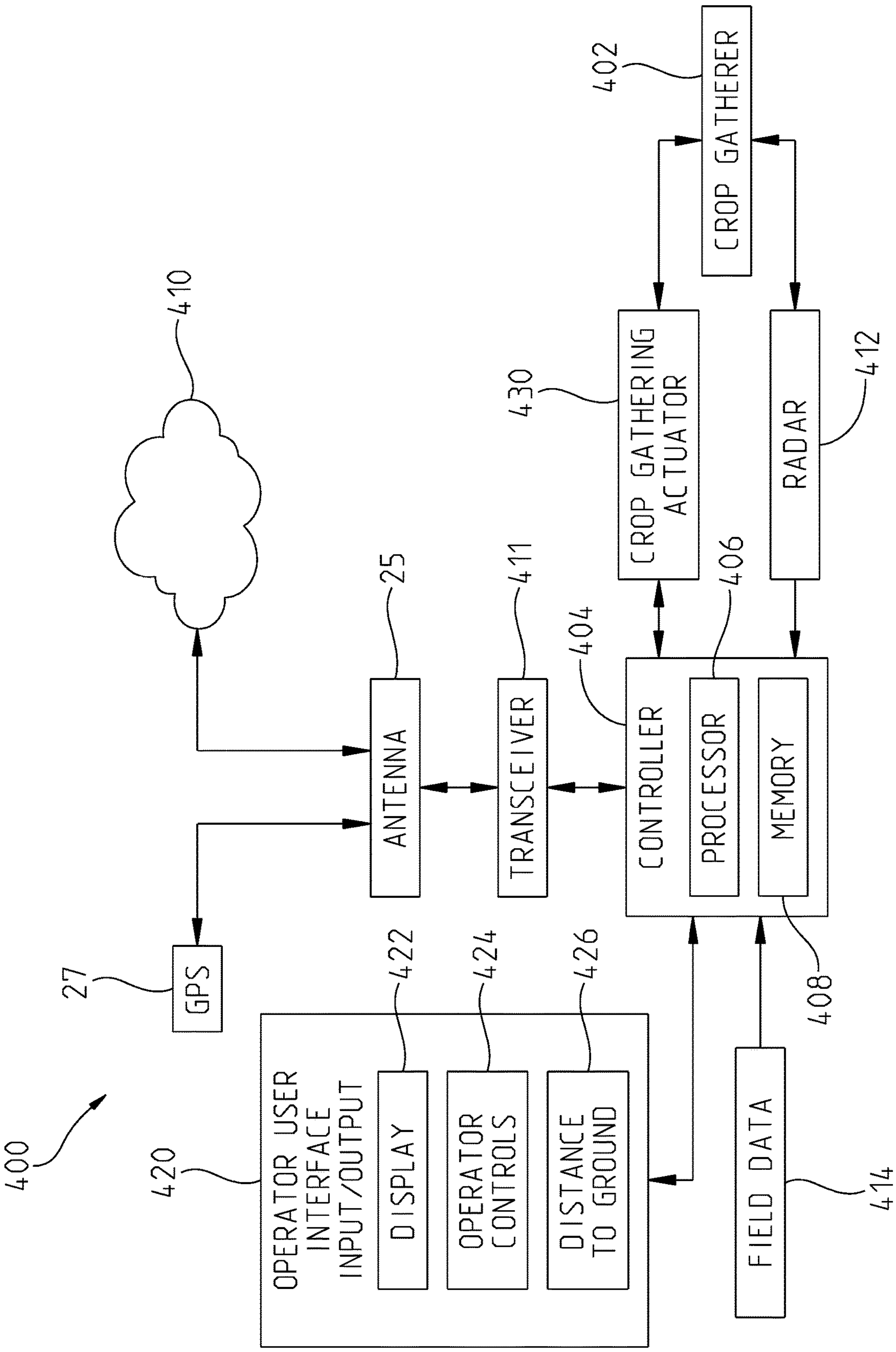
FIG. 10 illustrates a schematic block diagram of a control system for a harvester including a header mounted radar assembly.

FIG. 10 illustrates a schematic block diagram of a control system 400 configured to determine and adjust a height of a crop gatherer 402 when harvesting crop. As described, the control system 400 is resident in one or more of the harvesters 200, 220, and 300. The description of control system 400, consequently may be considered for each of the harvesters 200, 220, and 300. This description, however, is not considered to be limiting, and each of the control systems for each harvester 200, 220, and 300, as well as for other types of harvesters, may include features specifically adapted for a particular type of harvester.

The control system 400 includes one or more electronic controllers 404, also known as an electronic control unit (ECU), each of which is connected to a controller area network (CAN) bus (not shown) of the harvesters as described herein and to the various devices, systems, parts, or components of the harvesters. The CAN bus is configured to transmit electric signals for the control of various devices connected to the bus, as well as to determine status signals that identify the status of the connected devices.

The controller 404, in different implementations, includes a computer, computer system, or other programmable devices. In these and other implementations, the controller 404 includes one or more processors 406 (e.g. microprocessors), and an associated memory 408, which can be internal to the processor or external to the processor. The memory 408 includes, in different implementations, random access memory (RAM) devices comprising the memory storage of the controller 404, as well as any other types of memory, e.g., cache memories, non-volatile or backup memories, programmable memories, or flash memories, and read-only memories. In addition, the memory, in different implementations, includes a memory storage physically located elsewhere from the processing devices, and can include any cache memory in a processing device, as well as any storage capacity used as a virtual memory, e.g., as stored on a mass storage device or another computer coupled to controller 404. The mass storage device can include a cache or other dataspace which can include databases. Memory storage, in other implementations, is located in a cloud system 410, also known as the "cloud", where the memory is located in the cloud at a distant location from the machine to provide the stored information wirelessly to the controller 404 through the antenna 25 operatively connected to a transceiver 411, which is operatively connected to the controller 404. In other implementations, the controller 404 is located in the cloud 410.

When referring to the controller 404, the processor 406, and the memory 408, other types of controllers, processors, and memory are contemplated. Use of the cloud 410 for storing data, in one implementation, leads to storage economies of scale at a centrally located operations center, where data from a large number of harvesters is stored. In other implementations, data from other types of work machines is stored.

The controller 404 executes or otherwise relies upon computer software applications, components, programs, objects, modules, or data structures, etc. Software routines resident in the included memory 408 of the controller 404, or other memory, are executed in response to the signals received from a radar assembly 412 which is located on, at or within the harvesters 200, 220, and 300. Radar assembly 412, consequently, represents the described radar assemblies as well as other radar assemblies adapted for use in these and other harvesters. In one implementation, the radar assembly includes a radar transmitter and a radar receiver.

In one or more implementations, field data 414 is transmitted to or accessed by the controller 404. Field data 414 includes, but is not limited to, a map or other indicator of terrain or field conditions, such as slope, topography, soil conditions, crop height, or other crop conditions. While field data 414 is illustrated as operatively connected to the controller 404, other locations of field data are contemplated. For instance, field data 414 may be stored in the cloud 410 for access by the controller 404 or may be stored in memory 408, for instance in a database. Likewise, field data 414 may be generated by the GPS system 27 and transmitted to the controller 404. Field data may also be provided on a real time basis to the controller 404 by other sensors or imaging devices. Field data may be used to inform the control system, including the controller 404, of anticipated or forward looking field conditions and used to refine the real time local radar signal processing.

The field data may be used to identify the ground level by combining, or fusing, the field data with the real time radar signal. Field data 414, such as a map or other indicator of vegetative conditions, such as moisture content or vegetation mass, may be used to refine the real time radar signals, that may be scattered due to the vegetative conditions. In one implementation, for instance, a stereo camera is used to identify field data such as the tops of or the height of the crop. This field data may then be used to refine the scattered real time radar signal. By refining the scattered real time radar signal, the accuracy of the ground level signal may be improved. The use of one or more filed data signals in combination with the real time radar signal, consequently, provides an accurate and robust sensing system.

The controller 404 also receives signals from other controllers such as an engine controller and a transmission controller. The controller 404, in other implementations, also relies on one or more computer software applications that are located in the "cloud" 410, where the cloud generally refers to a network storing data and/or computer software programs accessed remotely, such as local cloud functionality not connected to the internet, or mesh networking among machines. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

An operator user interface 420 is operatively connected to the controller 404 and is located in the cab of a harvester to display machine information to an operator or user, as well as to enable the user to control operations of the harvester. The user interface 420 receives input data as well as transmits output data. The user interface 420 includes a display 422 to display status information directed to the condition or status of the harvester. Status information includes, but is not limited to, the operating status of the crop gatherer 402 as well as the signals transmitted and received by the radar assembly 412. The user interface 420 further includes operator controls 424 configured to enable the user to control the various functions and features of the crop gatherer 402, or other machine operating systems. A distance to ground user interface 426 is located at the user interface 420 and provides one or more functions. Such functions include, but are not limited to, a display of a current distance between the ground and the crop gatherer 402 or a current distance between the ground a crop cutter.

Depending on the type of crop gatherer 402 being employed, the distance to ground is configured to identify a distance between ground and a specific component of the crop gatherer 402. For instance, the distance of the crop gatherer 222 of the corn harvester 220 to ground represents the distance of the snout 254 to ground. For the crop gatherer 302 of the grain harvester 300 represents the distance of the cutter 322 to ground. In each implementation, therefore, the distance to ground may be configured to identify one or more parts of the crop gatherer 402 as desired. In some implementations, the distance to ground 426 also includes one or more operator controls which are configured to adjust the distance between the crop gatherer 402 and the ground.

Adjusting the position of the crop gatherer 402 is made by a crop gathering actuator 430 coupled to crop gather 402 as seen in FIG. 10. In the exemplary implementation of FIG. 8, the crop gathering actuator 430 is actuator 250 and in FIG. 9, the crop gathering actuator 430 is actuator 330. While hydraulic actuators are shown, other types of actuators are contemplated such as electric actuators and rotary actuators. Movement of the crop gatherer 402 also moves the radar assembly 412 to which the radar sensor is coupled as illustrated. By coupling the radar assembly 412 to the crop gatherer 402, a complete assembly that includes the crop gather 402 and the radar assembly 412 can be moved from one harvesting machine to another if desired.

Figure 11:
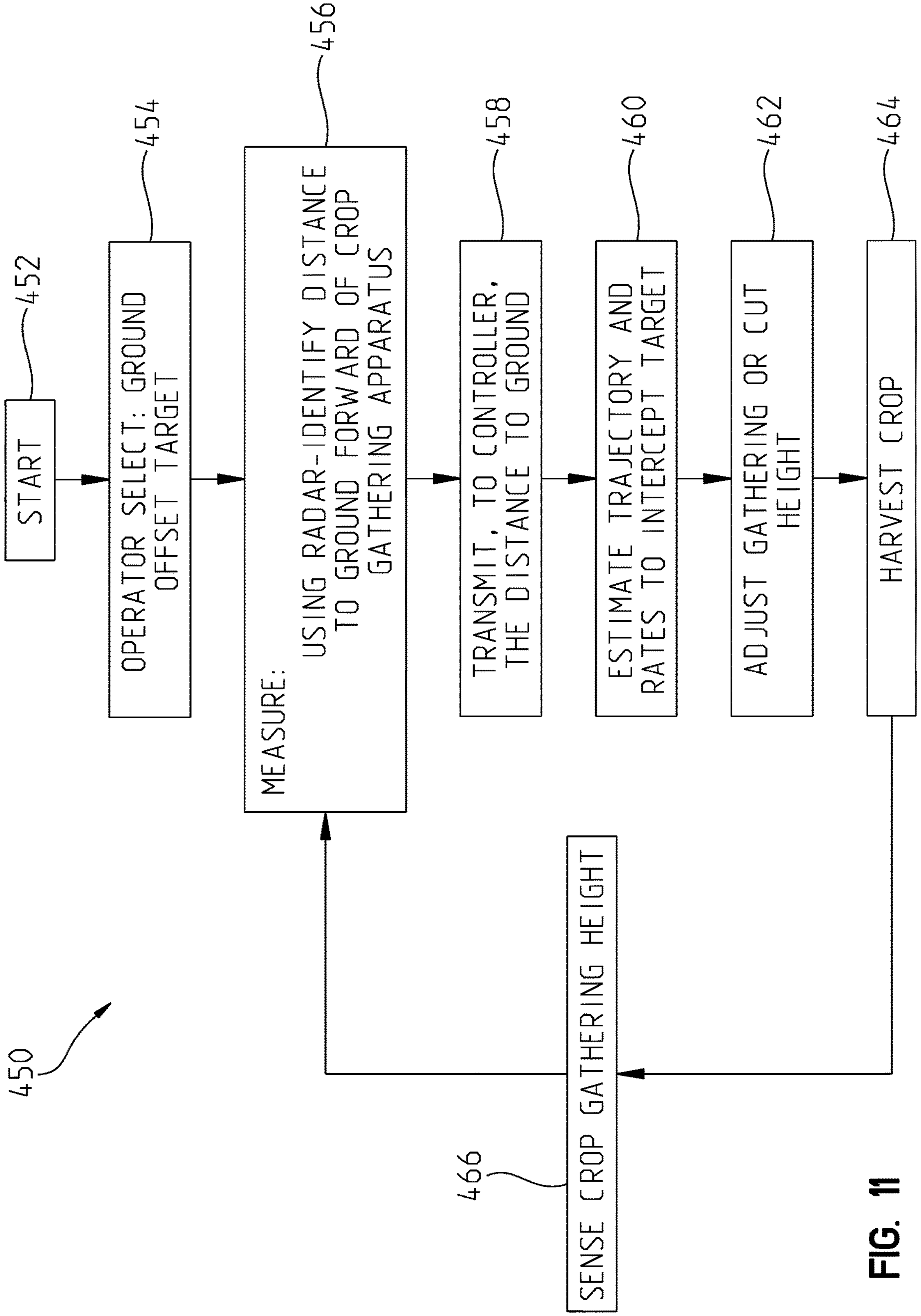
FIG. 11 illustrates a block diagram of a process for a radar based cutting height system for a harvester including a header mounted radar.

FIG. 11 illustrates a block diagram of a process 450 of the radar based crop gathering system of a harvester. The process 450 begins at start block 452, after which the user selects a ground offset target for crop gathering height at block 454. In one implementation, the user manually adjusts the height of the crop gatherer. Once adjusted, in one implementation, the adjusted height is input to the user interface 420 by the operator at the distance to ground input 426. In another implementation, the adjusted height is identified by the radar assembly 412 and transmitted to the controller 404 where the adjusted height is stored in memory 408. In a further implementation, the ground offset target, once determined, is adjusted by the crop gathering actuator 430 in response to control signals transmitted by the controller to crop gathering actuator 430.

The ground offset target establishes an initial height of the crop gatherer with respect to the ground surface. The selectable height can be determined by the user, or another individual, based on the type or condition of soil in which the crop is planted or based on a cutting height determined by user experience. In other implementations, the user selects the height using the controls 424 that display a number of predetermined height selections that are selectable though predefined buttons.

Once the height is selected at block 454, also known as a ground offset target, the controller 404 identifies an initial distance to ground at block 456 based on the received signal transmitted by the radar assembly 412. The initial distance to ground, once harvesting begins, is continuously updated and transmitted to the controller 404 at block 458 as the harvester continues harvesting while moving through the field. The controller 404 then adjusts the height of the crop gatherer 402 during a harvesting operation at block 460. In one or more implementations, the controller 404 takes into account one or more inputs including: 1) the selected height identified by the operator, 2) a location of the harvester determined by the GPS system 27, 3) an expected ground speed, and 4) an operating state of the transmission. Using these inputs the controller identifies a trajectory and a rate at which the crop, i.e. target, is intercepted. Since the radar assembly includes a radar transmitter that is forward looking, the controller 404 anticipates crop gathering variables such as crop height, crop density including moisture content, and changes in the ground surface. One or more of these elements is used to adjust, at block 462, a height of the crop gatherer or a cut height cutting blades of the crop gatherer 402 on a continuous basis. In this way, the crop is harvested at block 464, to optimize harvesting of crop.

In another implementation, the controller 404 adjusts the position of the crop gather 402 using map based farming (MBF). MBF is one type of a predictive analytics system use to identify ground features, for instance. By using this analytical tool, the oncoming ground features are identified and used to adjust the height of the crop gatherer. In other implementations, forward looking perception (FLP) is used. Using the mapping capabilities of MBF or FLP in combination with the radar sensor improves the terrain map estimations as well as removes error due to availability of maps, map resolution, or perception system limitations such as dust occlusion or biomass estimation.

By continuously adjusting the height of the crop gatherer by adjusting the crop gathering actuator 430 when required, large variations in cutting height of cut crop or large variations in crop gathering are avoided. The proactive terrain sensing compensates for system latency to actively adjust the crop gather position during terrain changes. By doing so, more crop is gathered which increases profitability and the harvesting can be done without significantly slowing down, which results in increased productivity. For a relatively level field, adjustments of crop gatherer height typically occur less often. If, however, the terrain is more hilly or contains terraces or swales, the crop gatherer height may be adjusted more rapidly when compared to traveling a relatively level field. Using this information, the controller 404 maintains a relatively consistent gathering height or cut height of harvested crop.

The relatively consistent cutting height is maintained by the controller 404 by constantly sensing crop gatherer height or cutting height as determined by the controller 404 at block 466. In other implementations, monitoring of blade height with respect to ground occurs at discrete periods of time, such as every five seconds. If the cutting height changes, the controller 404 adjusts the height of the crop gatherer to maintain the selected ground offset target at block 454.

Other work machines, known as autonomous machines, are controlled remotely without operator or user intervention at the machine itself. In such a system, a remote control system is used to remotely control operation of the harvester through web-based communication tools and platforms with the cloud 410, as is understood by those skilled in the art. In one implementation, an operator, user, or manager is located at a remote control system, which due to its cloud communication protocol, is located remotely from the harvester. In such an implementation, the control system 400 is a distributed control system having components located at one or more of the work machines, the cloud, and the remote control system. In one implementation, the autonomous machine includes a propulsion system having a power mover, such as an engine. The autonomous machine includes a frame supporting the crop gatherer.

The described implementations, provide an improved location of the gathering header that follows the ground more closely which in turn provides improved grain captured, productivity, and more uniform and consistent crop stubble. Wear and damage to crop gatherers and other machine components is reduced and operator fatigue and frustration is reduced.

In addition, proactive control of the crop header improves consistency of cut, reduces missed crop, and alleviates wear on the header. This results in maximum yield potential for the following year, improved revenue for a current year, and reduced machinery maintenance costs. In addition to the financial implications, operator fatigue from assisting AHHC is contributor to the overall effectiveness throughout the day. Furthermore, by providing improved header automation, future applications to autonomous harvesters benefit from increased productivity. By utilizing radar technology on the agricultural machine, superior results are achieved by detecting ground terrain below the crop canopy to achieve the resolution and accuracy needed for real-time machine adjustments.

The ground sensing solution, described herein, is capable of detecting the surface of the soil in bare dirt, stubble, standing crops, weeds, or combinations. The system detection of the ground location enables higher fidelity placement of the cutting apparatus to sever, gather, feed, and convey material. The location of the ground detected is proactive to the machine, i.e. ahead of the header.

In order to support the header performance adjustments and optimal machine productivity, the information relating to these attributes is important to determine in advance to frequently make micro-adjustments and macro-adjustments of the header. The location of the sensors used to assess these attributes are therefore ahead of the machine, and in particular the header, and looking down or slightly forward to the machine. Foreign object detection such as the detection of rocks, tree limbs, or trash, may also be identified in or under the crop, and may be avoided.

Terrain proximal to the work machine is identified and located and work modules such as (gathering or cutting platforms, attachments, implements, booms, identify the ground features and provide input to the dynamic control system. This assessment is done real-time, during job steps. The captured data may be used independently or merged with satellite/maps or onboard perception.

While exemplary implementations incorporating the principles of the present disclosure have been described hereinabove, the present disclosure is not limited to the described implementations. While crop harvesters have been described, other types of agricultural work machines are considered including, but not limited to, cotton harvesters, forage harvesters and windrowers. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An agricultural harvester operable to move in a forward direction to harvest crop growing from a ground, the agricultural harvester comprising:

a frame;

a crop gatherer extending from and being moveably coupled to the frame, the crop gatherer including one of a crop divider, a crop cutter, or a crop remover;

a radar assembly operatively connected to the crop gatherer, the radar assembly transmitting electromagnetic waves toward the ground to identify a ground level; and a controller operatively connected to the radar assembly and the crop gatherer, wherein the controller receives the identified ground level from the radar assembly and adjusts a height of the crop gatherer with respect to the identified ground level.

2. The agricultural harvester of claim 1 further comprising a radar support arranged to locate the radar assembly at or forward of one of the crop divider, the crop cutter, or the crop remover.

3. The agricultural harvester of claim 2 wherein the radar assembly is arranged to emit a radio wave along a path aimed in a downward direction generally perpendicular to the forward direction.

4. The agricultural harvester of claim 2 wherein the radar assembly is arranged to emit a radio wave along a path aimed in a forward looking field of view generally forward of a line extending generally perpendicular from the ground and from one of the crop divider, the crop cutter, or the crop remover, relative to the forward direction while harvesting crop.

5. The agricultural harvester of claim 4 wherein the path of the radar assembly in the forward looking field of view forms an angle with the line having a value of between approximately 0 degrees and 45 degrees.

6. The agricultural harvester of claim 4 wherein the path of the radar assembly in the forward looking field of view forms an angle with the line having a value of between approximately 0 degrees and 30 degrees.

7. The agricultural harvester of claim 2 wherein the radar support locates the radar assembly at a distance between 0.1 meters and 2 meters above the ground.

8. The agricultural harvester of claim 1 wherein the radar assembly includes one of a ground penetrating radar, an ultra-wide band radar, or a fixed frequency radar.

9. The agricultural harvester of claim 2 wherein the radar support includes a support arm and an adjustment mechanism operatively connected to the support arm, wherein the adjustment mechanism is adjustable to locate the support arm to position the radar assembly at or forward of one of the crop divider, the crop cutter, or the crop remover.

10. A method of harvesting a crop from a ground of a field using an agricultural harvester, the method comprising:

- identifying a crop gathering height for harvesting the crop from the field, wherein the crop gathering height is a height determined with respect to a crop gatherer and the ground;
- determining, with a radar assembly, a distance between the ground and the crop gatherer;
- comparing the identified crop gathering height to the determined distance between the ground and the crop gatherer;
- adjusting the distance between the crop gatherer and the ground based on the comparing step; and
- moving the agricultural harvester through the field to harvest the crop at the adjusted distance of the crop gatherer.

11. The method of claim 10 further comprising supporting the radar assembly on the crop gatherer with a radar support.

12. The method of claim 11 wherein the supporting step includes wherein the radar support locates the radar assembly at or forward of one of a crop divider, a crop cutter, or a crop remover of the crop gatherer.

13. The method of claim 12 wherein the supporting step includes supporting the radar assembly in a position arranged to emit a radio wave directed along a path aimed in a downward direction generally perpendicular to a moving direction of the agricultural harvester.

14. The method of claim 13 wherein the supporting step includes supporting the radar assembly in a position arranged to emit a radio wave directed along a path aimed in a forward looking field of view generally forward of a line extending generally perpendicular from the ground and from one of the crop divider, the crop cutter, or the crop remover.

15. The method of claim 14 wherein the path of the radar assembly in the forward looking field of view forms an angle with the line having a value of between approximately 0 degrees and 45 degrees.

16. The method of claim 14 wherein the path of the radar assembly in the forward looking field of view forms an angle with the line having a value of between approximately 0 degrees and 30 degrees.

17. The method of claim 11 wherein the supporting step includes supporting the radar assembly at a distance equal to or less than 2 meters above the ground.

18. The method of claim 11 wherein the comparing step includes comparing the identified crop gathering height to the determined distance between the ground and the crop gatherer on a continuous basis as the agricultural harvester moves through the field harvesting crop.

19. The method of claim 18 wherein the adjusting step includes adjusting the distance between the crop gatherer and the ground, based on the comparing step, on a continuous basis as the agricultural harvester moves through the field harvesting crop.

20. A crop gatherer for harvesting crop from a ground, the crop gatherer comprising:

- a lift actuator;
- a crop header operatively coupled to the lift actuator, the crop header including one of a crop divider, a crop cutter, or a crop remover, wherein the lift actuator adjusts a position of the crop header with the ground; and
- a radar assembly coupled to the crop header, the radar assembly configured to transmit an electromagnetic wave and to receive reflected electromagnetic waves to identify a ground level of the ground, the radar assembly including a radar support arranged to locate the radar assembly at or forward of one of the crop divider, the crop cutter, or the crop remover;
- wherein the radar support includes a support arm and an adjustment mechanism operatively connected to the support arm, wherein the adjustment mechanism is adjustable to locate the support arm to position the radar assembly at or forward of one of the crop divider, the crop cutter, or the crop remover.

* * * * *